Patented June 10, 1952

2,600,195

UNITED STATES PATENT OFFICE 2,600,195

SEALING CREVICES IN OIL WELLS

Donald C. Bond, Northbrook, Ill., assignor to The Pure Oil Company, Chicago, Ill., a corporation of Ohio No Drawing. Application March 31, 1948, Serial No. 18,300

13 Claims. (Cl. 166—22)

This invention relates to methods of drilling wells and more particularly concerns sealing materials to be used in connection with such operations.

In drilling oil and gas wells, it is customary, for example, to circulate around the drill in the bore a drilling mud which serves to carry out rock cuttings and to form a lining on the walls. The function of the lining is to prevent the walls from caving in and to render the bore hole more or less impermeable to the infiltration of extraneous fluids. Because the muds penetrate and seal many porous formations indiscriminately, that is, those which produce undesirable fluids and also those which produce the desired fluids, the use of conventional drilling muds is not entirely satisfactory.

Another problem which frequently occurs in the drilling of a well is that which is identified in the field as "lost circulation." This is generally attributed to the penetration of a formation which contains a crack of macroscopic dimensions and thereby permits substantial quantities of the mud containing all its ingredients to flow thereinto. Where the problem has been recognized in the past, attempts to counteract it have been made by incorporating fibrous materials, such as beet pulp, oat hulls, straw, sponge rubber, and the like into the drilling fluid with the thought that they would help mechanically to prevent this lost circulation. Also, where the lost circulation problem has been encountered, attempts have been made to use cementing agents, such as Portland cement and gypsum of controlled setting times with the theory that the material will remain fluid long enough to penetrate the fissure which is the cause of the lost circulation and then will set to seal it. However, these cementing agents frequently pass through macroscopic holes in the formation and are lost in much the same manner as is the mud. An additional danger in the use of such cementing agents is that it is quite difficult, if not impossible, to control their direction of flow in down-the-hole operations and, consequently, it is quite possible to seal up the bore hole itself in the attempt to seal crevices. Similar objections apply to various organic resins which have been forced into wells to seal fissures.

Accordingly, it is a fundamental object of the instant invention to provide a method of sealing crevices which are the cause of lost circulation in oil wells by incorporating in a drilling fluid particles of flour dough small enough to enter the fissures, but large enough to be caught mechanically therein and tough enough to have sufficient strength to seal the formation.

The second object of the invention is to provide a method of circulating flour dough balls into a well bore to induce their entry into a fissure and accomplish sealing thereof.

Other objects and advantages of the invention will in part be obvious and in part appear hereinafter.

The invention, accordingly, comprises the method of preventing lost circulation in a well bore by sealing the fissure causing it with tough flour dough and involves the steps and combinations of steps having the relationship each to the other to be hereinafter set forth. The invention also contemplates the incorporation in a drilling mud of more or less conventional formulation of dough balls made from starch and rendered sufficiently tough to keep their particle form, remain discrete and enter troublesome fissures in the well.

In accordance with the invention, I have found that small balls of dough, which are composed preferably of about 100 parts by weight of flour, containing about 5 to 15 per cent of gluten, and 50 parts by weight of water, though the proportion of flour to water can be varied from about 2:1 to 0.5:1, can be kneaded to a smooth consistency and boiled for a period of 10 to 30 minutes to toughen them and then used in this rubbery, tough form in a drilling mud which is to be passed into a well showing a substantial amount of lost circulation. Wheat flour naturally contains about 8 to 12 per cent of gluten and can be used directly in the production of tough doughs. Also a certain amount of chalk or other insoluble carbonate can be incorporated into the formulation so that the seal made by the dough balls can be subsequently disintegrated by contact thereof with a mineral acid, such as hydrochloric acid. In general, formulations of the dough balls made up from 100 parts by weight of wheat flour with 50 to 200 parts by weight of water can be used. The essential principle is to use just sufficient water to form particles which are easily handled and then to boil these particles to toughen the material to a hard rubbery consistency.

In practice, the method of sealing a well which is showing an undue amount of lost circulation would involve the preparation of dough balls of a variety of sizes from about ¼ or ½ inch in diameter to a few inches in diameter and pass the mixture of discrete balls into the hole together with the mud being used, taking care to have the mixture fall opposite the crevice it is desired to seal. In certain instances the use of dough balls having a diameter of 3 inches may be warranted. Water can be used to carry the balls into the well. Pressure is then applied to the well by running in additional mud or water, for example, thereby to force the balls into the crevice. After the seal has been effected, the surplus of dough in the bore hole is removed by breaking it up with a drill or disintegrated by means of a mineral acid, such as hydrochloric. The random size distribution of the balls used will insure the penetration of the troublesome fissure or hole by the balls.

The formulation of the type of dough balls to be used will be more readily understood by reference to the following examples and tabulations:

*Example 1.*—Flour alone, and, in additional tests, flour mixed with calcium carbonate, was blended with water and the mixture kneaded until the dough became smooth and elastic. This dough was formed into balls of desired size and the balls dropped into boiling water where they were kept for a period of 10 minutes. The boiling converted the dough balls into hard, tough, rubbery material which, for purposes of tests, were then placed in small beakers containing a small quantity of water or hydrochloric acid of various concentrations. The time required for disintegration of the dough balls was noted. The following tabulation gives results of the tests:

TABLE I

*Disintegration of dough balls made from cake flour*

| Comp. of Dough Ball Percent by Weight | | | Temp. F. | Time of Disintegration in Hours | | |
|---|---|---|---|---|---|---|
| Cake Flour | H₂O | CaCO₃ | | 8% HCl | 15% HCl | 20% HCl |
| 66.6 | 33.3 | 0 | Room | ------ | (¹) | ------ |
| 66.6 | 33.3 | 0 | 100 | 36 | 22 | ------ |
| 66.6 | 33.3 | 0 | 150 | 8 | 6 | 4 |
| 50 | 34.4 | 16.6 | Room | 80 | 20 | 16 |
| 50 | 34.4 | 16.6 | 100 | 20 | ------ | 9 |
| 50 | 34.4 | 16.6 | 150 | 6 | 5 | 3⅔ |
| 34.4 | 31.2 | 34.4 | Room | 12 | 11 | 12 |
| 34.4 | 31.2 | 34.4 | 100 | 12 | 10 | 8 |
| 34.4 | 31.2 | 34.4 | 150 | 8½ | 5 | 2½ |
| 68.8 | 31.5 | 9.7 | Room | ------ | ------ | 28 |
| 68.8 | 31.5 | 9.7 | 100 | 30 | 15 | 9 |
| 68.8 | 31.5 | 9.7 | 150 | 5¼ | 5¼ | 2⅔ |
| 44.4 | 33.4 | 22.2 | Room | 72 | 72 | ------ |
| 44.4 | 33.4 | 22.2 | 100 | 15 | 13 | ------ |
| 44.4 | 33.4 | 22.2 | 150 | 9½ | 3½ | ------ |

¹ After 80 hrs. ¼ disintegrated.

NOTE: (1) In all cases the size of the dough ball tested was such that the diameter was about 1⅛ inches. (2) In all cases it was found that the rate of disintegration of the dough balls when soaked in water was at least 5 to 10 times slower than the rate of disintegration in acid. (3) Cake flour, used in the tests summarized, is a wheat flour containing a relatively high proportion of gluten, i. e., about 11 per cent.

The dough balls containing no carbonate can be easily disintegrated using hydrochloric acid, but the action is rather slow. It was noted that the acids of greater concentration seemed to disintegrate the material more rapidly than acids of lower concentrations. The tests shown in Table I bring out this point. Dough balls containing calcium carbonate can be disintegrated more rapidly than those not containing it by using hydrochloric acid as is shown by the tests listed in the tables. The greater the amount of calcium carbonate in the formulation, the more rapid will be the disintegration on contact with hydrochloric acid. For the formulation of effective dough balls, the amount of the carbonate must be kept low enough to permit development of a good tough dough. The disintegration of the balls including calcium carbonate is essentially a mechanical effect resulting from the chemical action of the acid on the compound to release gas and tear the balls apart. Any material which would generate a gas upon contact with acid could be used, but alkaline earth metal carbonates are preferred because they are water insoluble, cheap and freely reactable with common acids. Various soluble gas generating materials could be used, such as the alkali metal carbonates, nitrite-amine formulations, and the like, but since the dough balls are to be carried into the well in an aqueous medium, they are not as desirable as insoluble materials because they would be leached out at least in part.

TABLE II

*Disintegration of dough balls made of ordinary bread flour*

| Comp. of Dough Ball Per Cent by Weight | | | Temp. F. | Time of Disintegration in Hours | | |
|---|---|---|---|---|---|---|
| Wheat Flour | H₂O | CaCO₃ | | 8% HCl | 15% HCl | 20% HCl |
| 66.6 | 33.4 | 0.0 | Room | (¹) | 70 | 50 |
| 66.6 | 33.4 | 0.0 | 100 | 31 | 25 | 30 |
| 66.6 | 33.4 | 0.0 | 150 | 15 | 6⅝ | 5¼ |
| 50.0 | 34.4 | 16.6 | Room | 44 | 36 | 30 |
| 50.0 | 34.4 | 16.6 | 100 | 16 | 12 | 8 |
| 50.0 | 34.4 | 16.6 | 150 | 8⅔ | 4⅔ | 4 |
| 34.4 | 31.2 | 34.4 | Room | 24 | 18 | 18 |
| 34.4 | 31.2 | 34.4 | 100 | 12 | 10 | 7 |
| 34.4 | 31.2 | 34.4 | 150 | 5¾ | 2⅝ | 1¾ |

¹ After 80 hrs. ½ disintegrated.

NOTE: (1) In all cases the size of the dough ball tested was such that the diameter was about 1⅛ inches. (2) In all cases it was found that the rate of disintegration of the dough balls when soaked in water was at least 5 to 10 times slower than the rate of disintegration in acid. (3) Bread flour, used in the tests summarized, is an ordinary wheat flour containing about 9 per cent of gluten.

The distinction between the problem which is to be solved by the incorporation of dough balls into a well drilling fluid to seal crevices in counteracting lost circulation from the type of sealing which is accomplished by using various organic jellifying materials should be noted. Processes and muds employing what are now conventional jellifying agents are described in such patents as United States Patents 2,259,419, of October 14, 1941, to D. G. Hefley and J. G. Staudt; 2,209,591, of July 30, 1940, to C. D. Barnes. Fundamentally, it reduces to the fact that a drilling mud using water as the vehicle can show an exceptionally high loss of water in a bore hole when it strikes a very porous formation in which the pores may be microscopic in size and yet be sufficiently open to absorb a very large quantity of the liquid. The jellifying agents described in the art are quite effective in sealing such formations where the holes are of microscopic size and the mechanical action involved is like filtration. However, where the openings to be counteracted are of macroscopic size, the organic jellifying agents are of little or no value and it is in this type of situation that the dough balls would be used. It is conceivable that both types of loss could be encountered in a single operation and treated simultaneously, for a large crack could occur in a very porous formation, thus requiring sealing of the microscopic pores and the macroscopic fissure. This could be done by incorporating the type of dough ball described in a conventional drilling mud or one containing organic jellifying materials for the sealing of the microscopic pores.

TABLE III

*Effect of common drilling mud on dough balls of cake flour*

| Comp. of Dough Ball Per Cent by Weight | | | Temp. F. | Duration of Test Hrs. | Effect of Mud |
| --- | --- | --- | --- | --- | --- |
| Cake Flour | H₂O | CaCO₃ | | | |
| 66.0 | 33.3 | 0.0 | Room | 48 | Not affected. |
| 66.6 | 33.3 | 0.0 | 150 | 24 | External softening. |
| 34.4 | 31.2 | 34.4 | Room | 48 | Not affected. |
| 34.4 | 31.2 | 34.4 | 150 | 24 | External softening. |

NOTE: In all cases the size of the dough ball tested was such that the diameter was about 1⅛ inches.

The mud was a conventional bentonite-starch mud, typical of those used in daily drilling operations, containing bentonite, starch, barite weighting agent and deflocculating material.

Because this invention has been described with only a few examples to indicate its scope, they are to be interpreted as illustrative and not as limiting the scope thereof.

What is claimed is:

1. In a method of drilling a well in which lost circulation through fissures in the well formation is experienced, the method of counteracting said lost circulation which comprises carrying into said well different sized tough rubbery parboiled macroscopic balls of flour dough composed chiefly of grain flour and containing gluten with a liquid carrying agent and subsequently applying to said well sufficient fluid pressure to cause said dough balls to deposit in said fissures.

2. In a method of drilling a well in which lost circulation through fissures in the well formation is experienced, the method of counteracting said lost circulation which comprises carrying into said well macroscopic balls of flour dough with a liquid carrying agent, said balls being prepared by mixing flour composed chiefly of grain flour containing gluten with sufficient water to form discrete balls, parboiling said balls to develop a tough rubbery adhesive texture, and subsequently applying to said well sufficient pressure to cause said dough balls to deposit in said fissures.

3. The method in accordance with claim 2 in which the dough balls are supplied in a variety of sizes in dispersion in a well drilling mud as the liquid carrying agent.

4. The method in accordance with claim 2 in which the dough balls vary in size at random from a diameter of ⅛ inch to about 3 inches.

5. In a method in accordance with claim 2 in which the lost circulation is counteracted, the method of reopening the well comprising, adding thereto sufficient hydrochloric acid to disintegrate the dough balls.

6. In a method of drilling a well in which lost circulation is experienced through fissures in the well formation, the method of counteracting said lost circulation which comprises carrying into said well macroscopic balls of flour dough composed chiefly of grain flour and containing 5 to 15 percent of gluten with a liquid carrying agent, said balls of flour dough comprising about 0.5 to 2.0 parts of flour to 1 part of water which have been parboiled to develop a tough, rubbery texture, and subsequently applying to said well sufficient fluid pressure to cause said dough balls to deposit in said fissures.

7. In a method of drilling a well wherein lost circulation through fissures in the well formation is experienced, the steps to counteract said lost circulation which comprise carrying into said well macroscopic balls of dough with a liquid and subsequently applying to said well sufficient fluid pressure to cause said dough balls to deposit in said fissures, said dough balls comprising from about 0.5 to 2.0 parts of grain flour with sufficient water within 1 to 20 parts to develop a tough rubbery textured dough ball on parboiling and sufficient amount of a material reactable with an acid to generate a gas but insufficient to interfere with said dough ball formation.

8. The method in accordance with claim 7 in which 1 part of said gas forming ingredient is present in said dough balls with from 1 to 7 parts of flour.

9. The method in accordance with claim 7 in which the dough balls are supplied to the well hole in a variety of sizes in suspension in a well drilling mud as the liquid carrying agent.

10. The method in accordance with claim 7 in which the dough balls vary in size at random from a diameter of ⅛ inch to about 3 inches.

11. In a method in accordance with claim 7 in which lost circulation is counteracted, the method of reopening the well comprising, adding thereto sufficient hydrochloric acid to disintegrate the dough balls by reaction with the gas forming ingredient.

12. The method in accordance with claim 7 in which the gas forming ingredient is a water-insoluble carbonate.

13. The method in accordance with claim 7 in which the gas forming ingredient is an alkaline earth metal carbonate.

DONALD C. BOND.

REFERENCES CITED

The following references are of record in the file of this patent:

UNITED STATES PATENTS

| Number | Name | Date |
| --- | --- | --- |
| 1,716,925 | Loomis | June 11, 1929 |
| 1,777,606 | Ehler | Oct. 7, 1930 |
| 1,807,082 | Boynton | May 26, 1931 |
| 2,119,829 | Parsons | June 7, 1938 |
| 2,221,261 | Lehnhard, Jr. | Nov. 12, 1940 |
| 2,245,886 | Weir et al. | June 17, 1941 |
| 2,337,295 | Kennedy | Dec. 21, 1943 |
| 2,342,588 | Larkin | Feb. 22, 1944 |
| 2,417,307 | Larsen | Mar. 11, 1947 |

OTHER REFERENCES

Jacobs, M. B., "The Chemistry and Technology of Food and Food Products," vol. 1, p. 629, Interscience Publishers, Inc., New York, 1944.